United States Patent
Münzenberger

(10) Patent No.: US 11,147,993 B2
(45) Date of Patent: Oct. 19, 2021

(54) FIRE PROTECTION ELEMENT

(71) Applicant: Hilti Aktiengesellschaft, Schaan (LI)

(72) Inventor: Herbert Münzenberger, Wiesbaden (DE)

(73) Assignee: Hilti Aktiengesellschaft, Schaan (LI)

( * ) Notice: Subject to any disclaimer, the term of this patent is extended or adjusted under 35 U.S.C. 154(b) by 68 days.

(21) Appl. No.: 16/461,813

(22) PCT Filed: Feb. 7, 2018

(86) PCT No.: PCT/EP2018/052997
§ 371 (c)(1),
(2) Date: May 17, 2019

(87) PCT Pub. No.: WO2018/153662
PCT Pub. Date: Aug. 30, 2018

(65) Prior Publication Data
US 2019/0366135 A1 Dec. 5, 2019

(30) Foreign Application Priority Data

Feb. 22, 2017 (EP) .................................. 17157383

(51) Int. Cl.
*A62C 2/06* (2006.01)
*F16L 5/04* (2006.01)
*H02G 3/04* (2006.01)
*H02G 3/22* (2006.01)

(52) U.S. Cl.
CPC ................ *A62C 2/065* (2013.01); *F16L 5/04* (2013.01); *H02G 3/0412* (2013.01); *H02G 3/22* (2013.01)

(58) Field of Classification Search
CPC ......... A62C 2/065; F16L 5/04; H02G 3/0412; H02G 3/22
USPC ......................................................... 169/48, 49
See application file for complete search history.

(56) References Cited

U.S. PATENT DOCUMENTS

| 3,976,825 | A | | 8/1976 | Anderberg | |
| 4,093,818 | A | * | 6/1978 | Thwaites | A62C 2/06 138/108 |
| 2011/0247839 | A1 | * | 10/2011 | Lalouch | F16L 57/04 169/45 |
| 2016/0123002 | A1 | * | 5/2016 | Munzenberger | H01B 17/26 174/152 G |

FOREIGN PATENT DOCUMENTS

| GB | 1 532 410 | 11/1978 |
| GB | 2 107 183 | 4/1983 |

OTHER PUBLICATIONS

International Search Report dated Apr. 9, 2018 in PCT/EP2018/052997 with English Translation.
Written Opinion dated Apr. 9, 2018 in PCT/EP2018/052997.
(Continued)

*Primary Examiner* — Christopher S Kim
(74) *Attorney, Agent, or Firm* — Grüneberg and Myers PLLC

(57) ABSTRACT

A fire protection element is useful for the separation of openings passing through walls or ceilings, and in particular useful for line passages. The fire protection element has a molded part with a honeycomb structure made from intumescent material.

10 Claims, 5 Drawing Sheets

(56) References Cited

OTHER PUBLICATIONS

Figure 1:
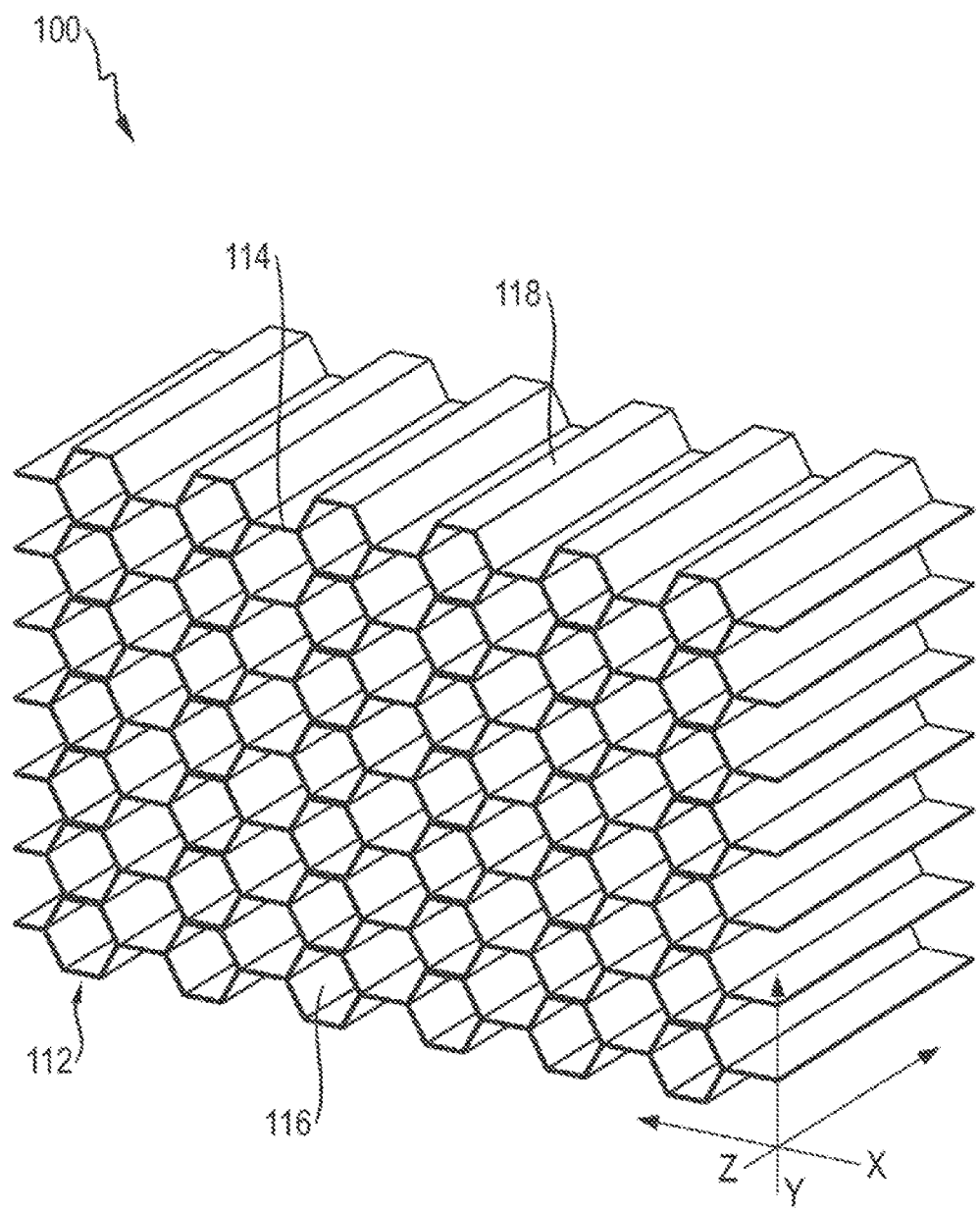

Jürgen Troitzsch, "*Intumescence Flame Retardants and Char Formation,*" Plastics Flammability Handbook, Principles, Regulations, Testing, and Approval, 3$^{rd}$ Edition, Jan. 15, 2004, pp. 139-145.
Weil et al., "*Overview of Modes of Action and Interaction of Flame Retardants,*" Flame Retardants for Plastics and Textiles, Practical Applications, 2009, pp. 241-251.

* cited by examiner

FIRE PROTECTION ELEMENT

This application is a National Stage entry under § 371 of International Application No. PCT/EP2018/052997, filed on Feb. 7, 2018, and which claims the benefit of European Application No. 17157383.5, filed on Feb. 22, 2017.

The invention relates to a fire-protection element for sealing of openings, especially of line passages, that are routed through walls or ceilings, having a molded part of intumescent material.

Fire-protection elements, which are capable of sealing line passages of non-fire-resistant pipes or cables in ceilings or walls in the fire situation, in order to prevent the spread of fire and smoke in buildings, are known in the most diverse configurations. The fire-protection elements usually contain an intumescent material containing expandable graphite, which is disposed around the lines, and a reinforcing inlay, which stabilizes the intumescent material.

In the known fire-protection elements, the expandable-graphite particles are activated by heat at the surface, expand toward the fire and for the time being form an insulating crust. After some time, however, this becomes unstable and drops off. Thus the crust is no longer available as an insulating layer and the intumescent layer situated underneath is activated. In this way, the fire-protection element burns away step-by-step and ensures protection for only a limited duration.

The object of the invention is to create a fire-protection element in which a more stable crust is formed in the fire situation and which thereby has improved fire-protection properties.

As the solution to the object, a fire-protection element is provided for sealing of openings, especially of line passages, that are routed through walls or ceilings, having a molded part of intumescent material, wherein the molded part has a honeycomb structure. Within the meaning of the invention, a honeycomb structure is a three-dimensional grid, which in a sectional plane is constructed from one or more basic shapes in the form of polygons and extends along an axis that in particular is oriented perpendicular to the sectional plane. Preferably, the honeycomb structure has a uniform, hexagonal basic shape and in this way forms a kind of honey or bee comb. Preferably, the honeycombs do not have bottoms or tops, whereby the honeycomb structure is formed by several tubes disposed next to one another and having a cross-section in the form of a polygon. In principle, all basic shapes are possible that permit tiling, i.e. the seamless and overlap-free coverage of a plane by partial surfaces having the same shape. In this way, the honeycomb structure has a homogeneous wall thickness and thus homogeneous properties such as density, strength and fire-protection properties. The advantage of the inventive fire-protection element is that, by virtue of the grid-like honeycomb structure, the intumescent material is able to expand into the honeycomb and bond there with intumescent material of adjacent honeycomb structures. Hereby a crosslinked stable crust, which ensures reliable fire protection for a longer time, is formed in the fire situation.

The molded part is preferably designed in pressure-stable manner in one direction and in flexible manner in all other directions oriented perpendicular to the first direction. As used in the invention, flexible means that the molded part may be compressed by a fitter, especially elastically. As used in the invention, pressure-stable means that the molded part can be loaded in one direction and opposite to it without substantial deformation of the molded part hereby, for example so that the molded part may be pushed by a fitter into an opening even against an active frictional force. In this way, the fire-protection element can be easily adapted to the opening to be sealed by a fitter on the spot by compressing it and at the same time may also be pushed under pressure into the opening. Alternatively, the molded part may be preferably designed in pressure-stable manner in two directions perpendicular to one another and in flexible manner in the direction perpendicular to these directions. Furthermore, the fire-protection element having at least one pressure-stable direction in the form of a plate may also be assembled as a wall or on walls.

It is of advantage when the first direction is oriented parallel to the axial extent of the honeycomb structure. Thus the fire-protection element is pressure-resistant in the direction that extends parallel to the honeycomb walls of the honeycomb structure. In this way, the honeycombs extend in axial direction through the opening, preferably perpendicular to the wall or ceiling of the opening, whereby lines may be routed through the fire-protection element without perforating honeycomb walls or damaging the honeycomb structure in the process.

According to a preferred embodiment, the honeycomb structure is filled with a filling foam. The filling foam ensures smoke-tight sealing of the opening through the fire-protection element, by the fact that the honeycomb structure is filled, especially completely, by the filling foam. Furthermore, the filling foam functions as bearing means for the lines as well as for sound absorption.

The filling foam does not have to contain any fire-protection additives. Since the honeycomb structure of intumescent material delivers the fire-protection properties of the fire-protection element, a filling foam containing little or no fire-protection additives may be provided. Hereby the fire-protection element can be manufactured particularly inexpensively.

The filling foam is preferably flexible, so that it tightly surrounds the lines routed through the filling foam and thus ensures particularly good smoke-tightness and/or sound insulation. Furthermore, the fire-protection element may be adapted more easily to various openings by a flexible filling foam, since in this way the fire-protection element can be compressed and tends on its own toward its initial condition.

A pressure-stable filling foam may be provided, in order to make the fire-protection element more stable.

In an advantageous embodiment, the fire-protection element has a frame that surrounds the molded part at least in portions in a peripheral direction, especially wherein the peripheral direction extends around an axis disposed parallel to the axial extent of the honeycomb structure. In this situation, preferably two opposite sides of the molded part, especially the sides in axial direction of the honeycomb, are substantially not covered by the frame. By the fact that the molded part is integrated in a frame, the molded part is protected and stabilized. In this way, the intumescent crust survives longer in the fire situation, the molded part burns more slowly and the fire-protection properties of the fire-protection element are improved.

The frame is preferably made in one piece. This offers the advantage that only few transition regions, in which intumescent material and/or filling material is able to emerge in the fire situation, are present between various portions of the frame. In this way, the frame limits spreading of the intumescent material in the fire situation and thus is able to steer the expansion of the intumescent material in a desired direction. Since the intumescent material therefore can no longer spread in uncontrolled manner in all directions, the quantity of intumescent material in the fire-protection element can be reduced, whereby lower manufacturing costs are achieved. Furthermore, various portions of the frame stabilize one another mutually during expansion of the intumescent material, and so the structural integrity of the fire-protection element is improved by this configuration.

The frame preferably comprises a material from the following group: cardboard, metal, glass fibers, basalt fibers, carbon fibers or ceramic fibers. A hybrid structure of the frame comprising several materials is also possible. Compared with the intumescent material of the honeycomb structure, these materials have a higher temperature resistance. This is advantageous, since the frame is not impaired by the temperature that activates the intumescent material and so is able to exert its stabilizing function in this way even in the fire situation.

Preferably, the frame comprises a metal sheet, an expanded metal, a mineral building panel, a glass-fiber mesh or fabric. The use of a fabric offers good joining of the frame to the intumescent material and/or to the filling material. Furthermore, a frame comprising a fabric retains its stabilizing properties even in the presence of isolated structural damage.

The frame may comprise an intumescent material, wherein the intumescent material may be identical to the intumescent material of the honeycomb structure. Hereby the frame expands in addition to the intumescent material of the honeycomb structure in the fire situation and ensures impervious sealing of the opening as well as a secure bearing means for the fire-protection element in the opening.

In a further advantageous embodiment, the fire-protection element has a cover plate, in order to protect the molded part. The cover plate is provided in particular to cover the fire-protection element in the direction of the axial extent of the honeycomb structure. Preferably, a cover plate is provided on that side of the fire-protection element which is situated outwardly, i.e. potentially turned toward the fire. It is of advantage when the cover plate covers one side of the molded part substantially completely.

The cover plate preferably comprises a material from the following group: cardboard, metal, glass fibers, basalt fibers, carbon fibers or ceramic fibers. A hybrid structure of the cover plate comprising several materials is also possible. Compared with the intumescent material of the honeycomb structure, these materials have a high temperature resistance and improve the fire-protection properties of the fire-protection element.

Preferably, the cover plate comprises a metal sheet, an expanded metal, a mineral building panel, a glass-fiber mesh or fabric. The use of a fabric has the advantage that lines may be routed more easily through the cover plate. Furthermore, a cover plate comprising a fabric retains its structural integrity even in the presence of isolated damage.

The cover plate may comprise an intumescent material. Hereby the cover plate represents an additional intumescent layer, which improves the fire-protection properties of the fire-protection element.

It is of advantage when the molded part contains expandable graphite. By the fact that the intumescent material of the honeycomb structure contains expandable graphite as an essential ingredient, stems of expandable-graphite particles are formed in the honeycombs in the fire situation and become intertwined with other stems of expandable-graphite particles on opposite honeycomb walls to form clusters. In this way, a cross-linked structure of expandable-graphite particles is formed in the fire situation, thus ensuring particularly high stability of the intumescent crust and thus decisively improving the fire-protection properties of the fire-protection element.

Figure 2:
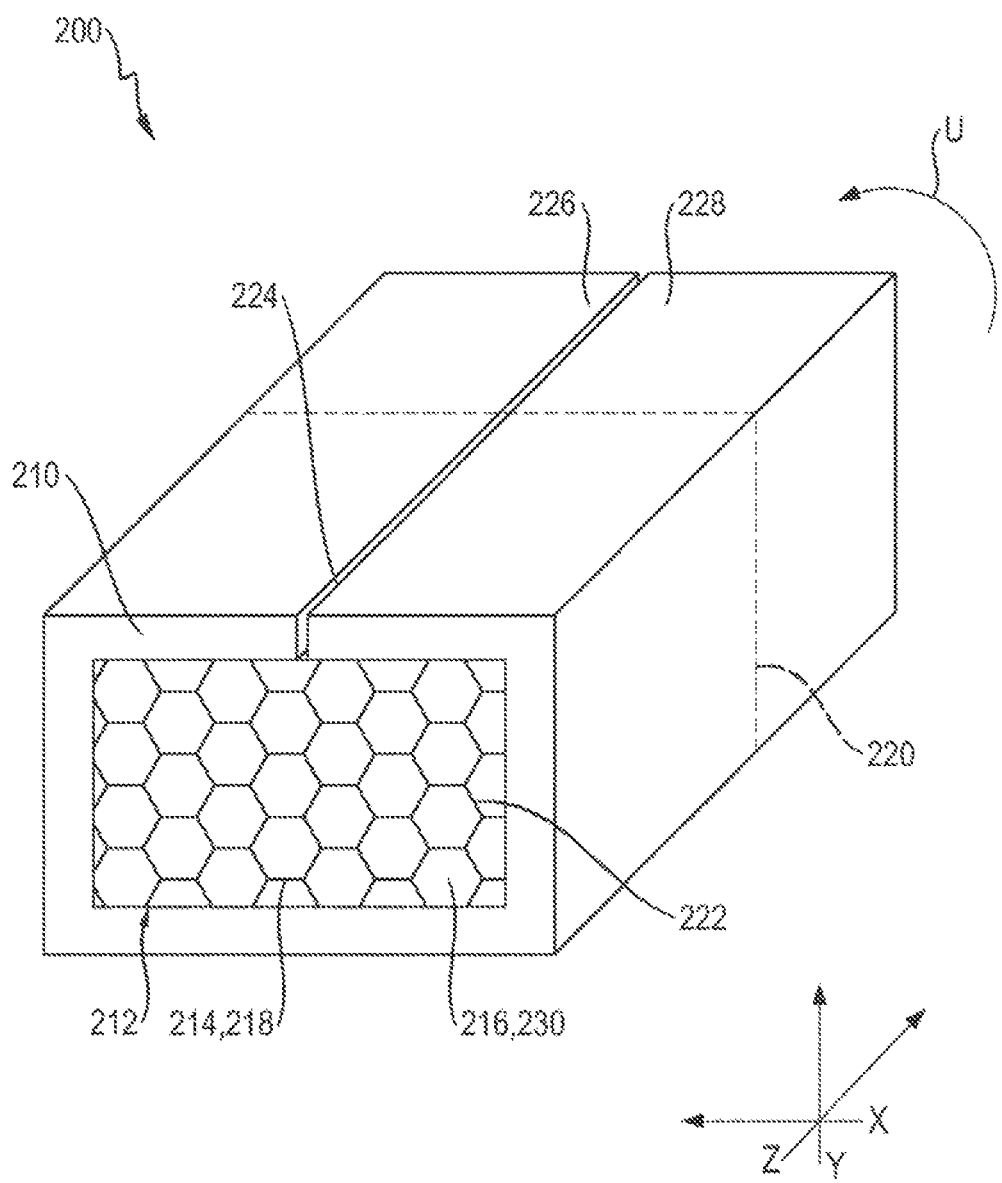
Figure 3:
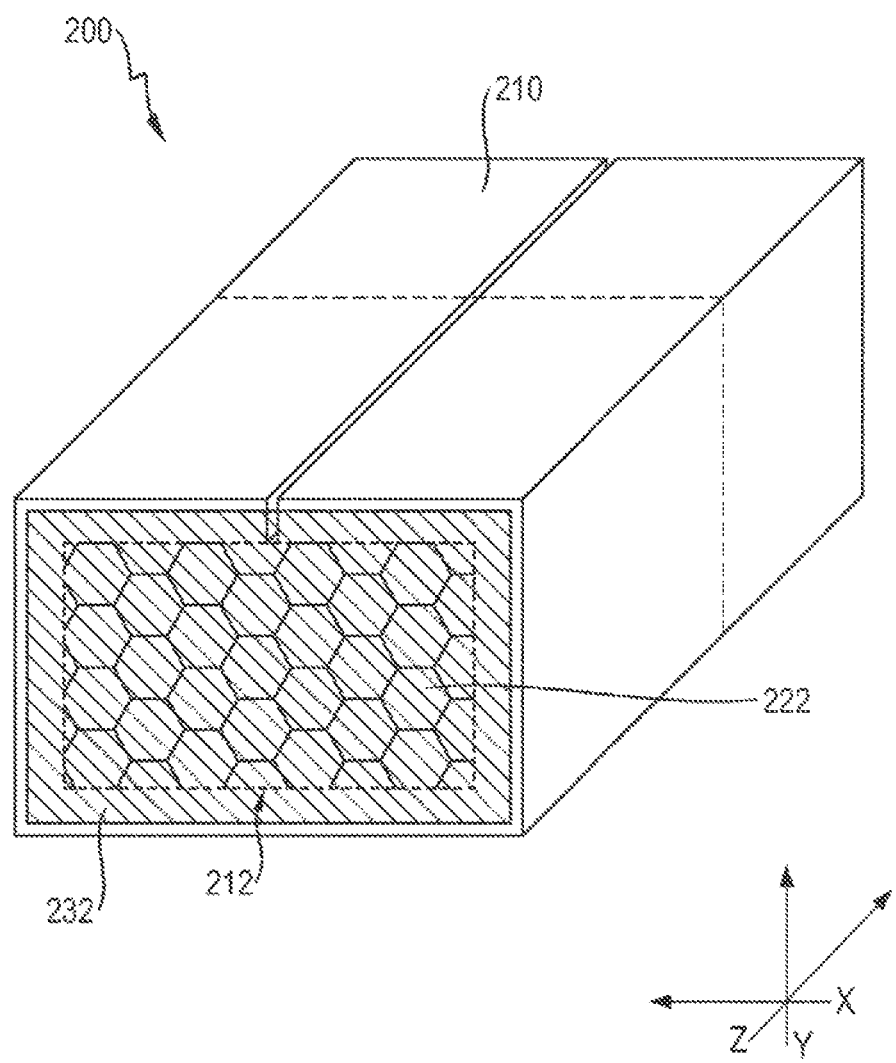
Figure 4:
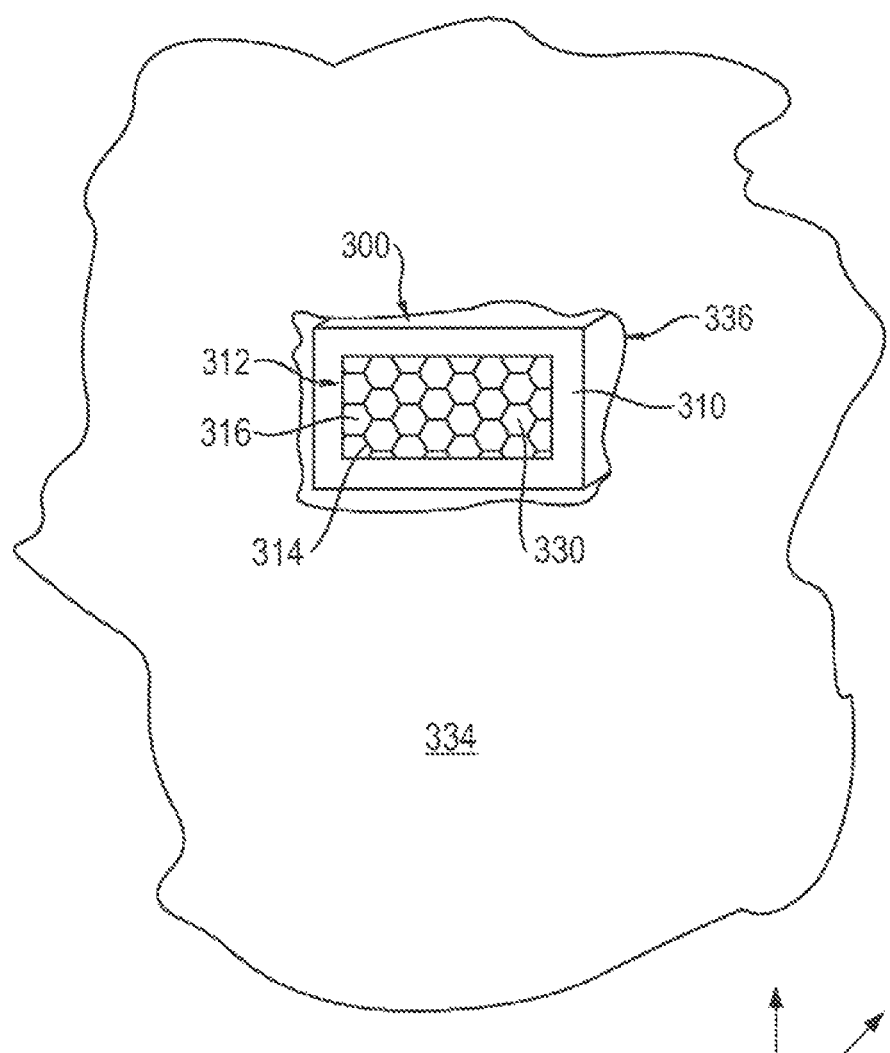
Figure 5:
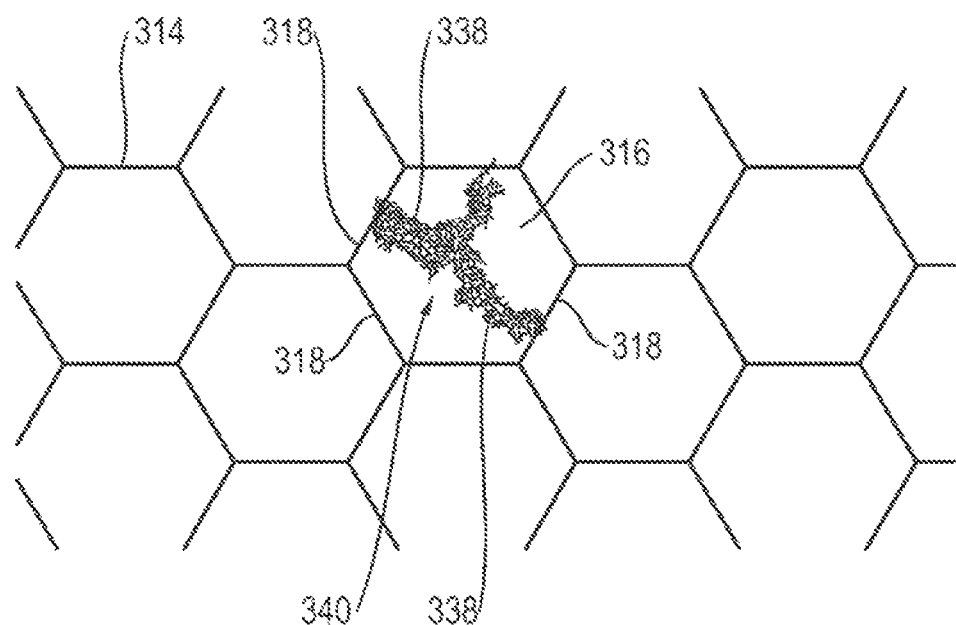

Further advantages and features will become obvious from the description hereinafter in conjunction with the attached drawings, wherein:

FIG. 1 shows a perspective diagram of a first embodiment of an inventive fire-protection element, FIG. 2 shows a perspective diagram of a second embodiment of an inventive fire-protection element, FIG. 3 shows a perspective diagram of the fire-protection element from FIG. 2 with a cover plate, FIG. 4 shows a perspective diagram of a third embodiment of an inventive fire-protection element, which is installed in an opening, and FIG. 5 shows a schematic diagram of a cluster of expandable-graphite particles in a honeycomb of the fire-protection element from FIG. 4.

In FIG. 1, an inventive fire-protection element 100 having a molded part 112 of intumescent material is shown that is intended for fireproof sealing of building-part openings having line passages such as cables and/or pipes.

Molded part 112 is an approximately rectangular block, the edges of which extend along the axes X, Y and Z of an orthogonal coordinate system.

In an alternative embodiment, molded part 112 may have any desired geometry that is suitable for securely sealing an opening routed through walls or ceilings. In particular, molded part 112 may be designed as a plate, mat or plug. Furthermore, molded part 112 may be provided as a profile, whereby it can be used in particular for sealing of joints.

Molded part 112 has a honeycomb structure 114, which is formed by honeycombs 116 having an equilateral hexagonal basic shape in the X-Y plane and the honeycomb walls 118 of which extend axially in Z-direction.

The honeycombs 116 are provided in tubular form, i.e. the honeycombs have no bottom or top in axial direction Z. Hereby lines may be routed through molded part 112 in axial direction Z without resistance, because honeycomb structure 114 does not have to be perforated for this purpose. A further advantage of this tubular design of honeycomb structure 114 is that fire-protection element 100 is pervious to air in axial direction Z. In this way, fire-protection element 100 is able, for example, to ensure the necessary ventilation in a gap of a wall having a curtain facade, but is also able to seal the gap in the fire situation by the reaction of the intumescent material.

Due to this design, fire-protection element 100 is formed in pressure-stable manner in axial direction Z and in flexible manner in directions X and Y, so that fire-protection element 100 may be compressed by a fitter with little exertion of force in any desired direction perpendicular to the axial extent of honeycomb structure 114.

In an alternative embodiment, molded part 112 may be provided with honeycombs 116 having tops or bottoms, which increase the stability of honeycomb structure 114 and/or seal honeycombs 116 in a smoke-tight and/or sound-insulating manner.

The intumescent material from which molded part 112 is formed comprises a proportion of expandable graphite and, depending on requirement, may have special intumescence behavior (including foam height, pressure and activation temperature), by means of which fire-protection element 100 may be adapted to different service conditions.

In FIG. 2, a further embodiment of an inventive fire-protection element 200 is shown that comprises a frame 210 as well as a molded part 212 of intumescent material having a honeycomb structure 214, which is constructed in a manner identical to molded part 112 of fire-protection element 100. Thus corresponding reference symbols are used hereinafter for like structures having like functions.

Fire-protection element 200 is rectangular and is enclosed at its periphery 220 in peripheral direction U by frame 210, wherein end faces 222 of molded part 212 remain free. Peripheral direction U extends around the Z-axis, which is disposed parallel to the axial alignment of honeycombs 216. Thus end faces 222 have the basic shape of honeycomb structure 214 in the X-Y plane and honeycombs 216 extend in Z-direction through the entire molded part 212.

The invention is not limited to fire-protection elements 200 having rectangular molded parts 212 and frame 210, but instead it also comprises fire-protection elements 200 that have any desired shape and any desired cross section.

Frame 210 covers periphery 220 completely except for a narrow slit 224. This slit 224 is formed by two oppositely disposed ends 226, 228 of frame 210, which face one another on one side of fire-protection element 200.

In an alternative embodiment, frame 210 may be closed in peripheral direction U and not have any slit 224 (see FIG. 4).

Frame 210 is preferably made in one piece. Alternatively, frame 210 may be formed from several portions joined to one another.

Honeycombs 216 of honeycomb structure 214 are filled with a flexible filling foam 230. Alternatively, honeycomb structure 214 may be filled with a pressure-stable filling foam 230.

Filling foam 230 contains substantially no fire-protection additives. Alternatively, filling foam 230 may comprise fire-protection additives, in order to improve the fire-protection properties of fire-protection element 200.

Honeycomb structure 214 is preferably filled uniformly with filling foam 230, in order to ensure homogeneous properties over the entire molded part 212.

In an alternative embodiment, at least part of honeycombs 216 may be filled in portions with a filling foam 230. For example, honeycombs 216 may be filled with filling foam 230 only at the end faces 222, while honeycombs 216 are empty in the interior. In this way, filling foam 230 may be saved and the weight of fire-protection element 200 may be reduced.

Furthermore, honeycombs 216 of molded part 212 may be filled with different filling foams 230, or molded part 212 may have empty honeycombs 216, i.e. without filling foam 230, in order to combine the properties of the various filling foams 230 or of empty honeycombs 216. For example, all honeycombs 216 that adjoin a honeycomb 216 having a pressure-resistant filling foam 230 may be filled with a flexible filling foam 230. In this way, molded part 212 is at least partly compressible due to the flexible filling foam 230, and at the same time has improved stability due to the honeycombs 216 having pressure-stable filling foam 230. It is further of advantage when different filling foams 230 can be identified, for example by a colored marking on end faces 222. Among other possibilities, this permits simplified assembly, by the fact that lines may be routed selectively through honeycombs 216 having a filling foam 230, which by virtue of its properties offers less resistance to the routing of lines or which bears closely on the lines and in this way ensures particularly high impermeability.

Filling foam 230 is joined securely, preferably by substance-to-substance bond, to honeycomb structure 214. Hereby it is ensured that filling foam 230 is not forced out of honeycombs 216 when a line is routed through filling foam 230 or a penetration for a line is formed in filling foam 230.

Molded part 212 is joined securely, preferably by substance-to-substance bond, to frame 210.

Frame 210 consists of an expanded metal. In an alternative embodiment, frame 210 may be formed from a panel, a mat, a mesh or a fabric, which preferably consists of cardboard, metal, glass fibers, basalt fibers, carbon fibers or ceramic fibers.

In an alternative embodiment, frame 210 may comprise an intumescent material, especially the same intumescent material as honeycomb structure 214.

Frame 210 may be formed exclusively of intumescent material. Alternatively, frame 210 may additionally contain intumescent material, wherein the non-intumescent material of frame 210 may form a reinforcing inlay, which is applied on a layer of intumescent material or is disposed at least partly in a layer of intumescent material. In both cases, the layer of intumescent material is joined securely to the reinforcing inlay.

Fire-protection element 200 may have a cover plate 232 (see FIG. 3), which covers one side of fire-protection element 200, at least in portions.

In FIG. 3, cover plate 232 covers end face 222 of molded part 212 and in this way forms an additional protective layer.

Cover plate 232 consists of expanded metal. In an alternative embodiment, cover plate 232 may be formed from a panel, a mat, a mesh or a fabric, which preferably consists of cardboard, metal, glass fibers, basalt fibers, carbon fibers or ceramic fibers.

In an alternative embodiment, cover plate 232 may comprise an intumescent material, especially the same intumescent material as honeycomb structure 214.

Cover plate 232 is joined securely, preferably by substance-to-substance bond, to molded part 212 and/or to frame 210.

Fire-protection element 200 may have several cover plates 232, which are disposed on various sides of fire-protection element 200.

Several cover plates 232 may be disposed one beside the other and/or one above the other on one side of fire-protection element 200.

In a preferred embodiment, fire-protection element 200 is plate-shaped and on its upper side and/or underside has a cover plate 232, which preferably covers the corresponding side completely. In this case, cover plate 232 improves the stability of the plate-shaped fire-protection element.

The manufacture of honeycomb structure 114, 214 of the inventive fire-protection element 100, 200 takes place by means of an intumescent foam, which is introduced into a mold having a corresponding geometry.

If a frame 210 of intumescent material is provided for fire-protection element 100, 200, it may be formed directly in this step by means of a corresponding mold.

In a subsequent step, honeycombs 116, 216 may be sprayed with a filling foam 230.

In order to form a fire-protection element 100, 200 having a frame 210, frame 210 may be provided in an open mold, for example as a panel or with a channel profile. Molded part 112, 212 is placed on the frame inner side and ends 226, 228 are folded around molded part 112, 212, whereby a closed frame 210 is formed.

Slits 224 in frame 210 may be sealed by a suitable fire-protection means, for example an intumescent inlay, and/or sprayed with an intumescent foam material.

Alternatively, molded part 112, 212 may also be inserted into an already formed frame 210.

Preferably, molded part 112, 212 has a small oversize, so that molded part 112, 212 is held in frame 210 by means of press fit and gaps are securely sealed.

In addition or alternatively, molded part 112, 212 may be fastened in frame 210 by substance-to-substance bond, for example by adhesive bonding, in order to prevent molded part 112, 212 from being forced out of frame 210.

In an alternative manufacturing method, frame 210 of fire-protection element 200 is formed first and then molded part 112, 212 is formed directly in frame 210. In this way, frame 210 may function as part of the mold used to manufacture molded part 112, 212.

Fire-protection element 100, 200 may be installed as a finished product in an opening to be sealed.

Alternatively, fire-protection element 100, 200 may be finished only in the opening to be sealed, especially by introducing filling foam 230 into honeycombs 216 only when honeycomb structure 214 is already disposed in the opening. In this case, honeycomb structure 214 may be used to route lines in a manner spaced apart from one another through the fire-protection element, before filling foam 230 is introduced.

In FIG. 4, a detail of a wall 334 having an opening 336 is shown, in which a fire-protection element 300 is installed as a firewall.

Fire-protection element 300 is disposed such that end faces 322 are aligned substantially parallel to wall 334 and the sides covered by frame 310 point in the direction of wall 334. In this way, honeycombs 316 extend in Z-direction through opening 336, and lines may be routed through fire-protection element 300 without damaging honeycomb structure 314 and/or frame 310 in the process.

Due to the flexibility of honeycomb structure 314 perpendicular to the extent of honeycombs 316 in Z-direction, fire-protection element 300 may be compressed with little exertion of force in X- and Y-direction and adapted to the cross section of opening 336. By virtue of the stability of honeycomb structure 314 in the direction of the axial extent of honeycombs 316, fire-protection element 300 further has the necessary pressure resistance in Z-direction in order to be able to force or push fire-protection element 300 into opening 336.

In order to route lines through fire-protection element 300, a penetration through which the line may be pushed may be created in filling foam 330, by means of a lance, for example.

In FIG. 5, it is illustrated by way of example, on the basis of a honeycomb 316, how the inventive fire-protection element behaves in the fire situation. When a limit temperature is exceeded, the expandable-graphite particles in the honeycomb structure 314 are activated and expand as stems 338 in honeycombs 316. There, stems 338 of various honeycomb walls 318 branch out and form clusters 340, which leads to cross-linking of honeycomb structure 314. In this way, the stability of the intumescent crust being formed is increased, whereby this offers longer-lasting protection.

Depending on whether, how or with which kind of filling foam honeycombs 316 are filled, influences the spreading behavior of stems 338 and the formation of clusters 340. By suitable choice of the fillings of honeycombs 316 as well as of their arrangement, special cross-linking patterns may be provided hereby that impart particularly favorable fire-protection properties to fire-protection element 300 in the fire situation.

In this way, an opening routed through walls or ceilings can be sealed safely and durably, in rapid and simple manner, by the inventive fire-protection element.

The invention claimed is:

1. A fire-protection element for sealing of openings in walls or ceilings, the fire-protection element comprising:
a honeycomb structure having a plurality of openings disposed adjacent to one another and being made of a material consisting of an intumescent material and expandable-graphite particles, wherein a cross section of each of the plurality of openings has a polygon shape, wherein the honeycomb structure extends in an axial direction, wherein at least a part of the intumescent material forming a wall of a first of the plurality of openings is shared with a wall of a second of the plurality of openings that is adjacent to the first of the plurality of openings, wherein prior to activation the plurality of openings are unobstructed along their axial length by the intumescent material, and wherein each wall in the honeycomb structure has homogeneous thickness in a direction perpendicular to an axial direction along the axial length, and
a frame that surrounds the honeycomb structure along the axial direction.

2. The fire-protection element according to claim 1, wherein the honeycomb structure is more compressible in the direction perpendicular to the axial direction than in the axial direction.

3. The fire-protection element according to claim 1, wherein the honeycomb structure is filled with a filling foam.

4. The fire-protection element according to claim 3, wherein the filling foam is flexible.

5. The fire-protection element according to claim 3, wherein the filling foam is pressure-stable.

6. The fire-protection element according to claim 1, wherein the frame comprises at least one material selected from the group consisting of cardboard, metal, glass fibers, basalt fibers, carbon fibers, and ceramic fibers.

7. The fire-protection element according to claim 1, wherein the frame comprises an intumescent material and has a higher temperature resistance than the honeycomb structure.

8. The fire-protection element according to claim 1, wherein the fire-protection element has a cover plate.

9. The fire-protection element according to claim 8, wherein the cover plate comprises at least one material selected from the group consisting of cardboard, metal, glass fibers, basalt fibers, carbon fibers, and ceramic fibers.

10. The fire-protection element according to claim 8, wherein the cover plate comprises an intumescent material and has a higher temperature resistance than the honeycomb structure.

* * * * *